United States Patent Office 3,630,877
Patented Dec. 28, 1971

3,630,877
ELECTROLYTICALLY MACHINING APPARATUS
Kazushige Koike and Akio Sarai, Nagoya, Japan, assignors to Mitsubishi Denki Kabushiki Kaisha, Tokyo, Japan
Filed Sept. 11, 1968, Ser. No. 759,158
Claims priority, application Japan, Sept. 18, 1967, 42/59,699
Int. Cl. B23p 1/02, 1/12
U.S. Cl. 204—224                                                   7 Claims

ABSTRACT OF THE DISCLOSURE

An electromagnetic flow meter measures a flow rate of a liquid electrolyte supplied to a working gap between a workpiece and a working electrode. In order to maintain the gap constant, a machining voltage or current is controlled to have its reference magnitude while simultaneously the current or voltage is controlled to make the measured flow rate equal to its constant reference magnitude. With the electrode arranged to move toward the workpiece at a constant feed rate, the feed rate is determined so as to make the machining current density equal to its constant reference magnitude while the machining voltage is controlled to make the measured flow rate equal to its constant reference magnitude. Alternatively, the machining voltage is controlled to have its constant reference magnitude while the feed rate is controlled to make the measured flow rate equal to its reference magnitude.

BACKGROUND OF THE INVENTION

This invention relates to an electrolytically machining apparatus for forming recesses, bores etc., on workpieces by means of the electrolytic action.

The electrolytically machining process generally comprises the steps of disposing a workpiece and a working electrode in opposite relationship to form a very narrow working gap therebetween, and supplying and passing a liquid electrolyte to and through the working gap while at the same time an electrical energy is supplied across the workpiece and electrode to electrolyze the liquid electrolyte flowing through the working gap thereby to form a recess, bore or the like having a predetermined configuration on the workpiece. In the electrolytically machining process it is particularly necessary to maintain always the width of the working gap at a certain constant magnitude during the machining operation in view of the standpoint of an increase in degree of machining accuracy.

It is now assumed that a liquid electrolyte having a specific resistance of $\rho$ in ohms per centimeter flows through a working gap having a width of $g$ in centimeters thereby to electrolytically machine a surface area of S in square centimeters on the particular workpiece with a machining voltage of V in volts applied across the gap and with a machining current of I in amperes flowing therethrough. Under the assumed condition, the width of the working gap $g$ may be expressed by the following equation:

$$g = \frac{1VS}{SI} = \frac{1V}{\rho J} \qquad (1)$$

where J represents the current density of the machining current and equals $I/S$.

In order to maintain the width of working gap constant, it has been previously practiced to detect the machining voltage V and maintain the detected voltage at a predetermined constant magnitude while at the same time a feed rate at which working electrode is moved toward the opposite workpiece is maintained constant thereby to maintain the current density J at a predetermined constant magnitude. In other words, the conventional type of electrolytically machining processes has been to maintain the constant magnitudes of the machining voltage and current density V and J respectively appearing on the righthand side of the above equation (1) during the machining operation. It will be apparent that the working gap can be maintained always constant as long as the specific resistance $\rho$ of the liquid electrolyte has a fixed magnitude. It is, however, not considered that during the machining operation the liquid electrolyte will continue to have the specific resistance $\rho$ maintained constant. This is because the liquid electrolyte in operation is apt to change in temperature and/or concentration and also has mixed therewith a product or products dissolved into the same through the particular electrolysis. Therefore, in the conventional apparatus carrying out the electrolytically machining process as above outlined, the working gap can vary in width during the operation resulting in a decrease in degree of machining accuracy.

SUMMARY OF THE INVENTION

Accordingly it is an object of the invention to provide a new and improved electrolytically machining apparatus capable of effecting electrolytic machining with a high degree of machining accuracy while always maintaining a working gap involved constant even though a specific resistance of a liquid electrolyte involved would vary during the electrolytically machining operation.

Briefly, the invention accomplishes the above object by the provision of an electrolytically machining apparatus comprising a workpiece and a working electrode disposed in opposite relationship to form a working gap therebetween, means for supplying a liquid electrolyte to the working gap, an electrical supply system for applying a machining voltage across and a flow of machining current through the workpiece and working electrode to electrolyze the electrolyte supplied to the working gap characterized by detector means for detecting a flow rate of the electrolyte supplied to the working gap, first control means for controlling a first one of machining parameters determining the working gap to have a predetermined constant magnitude, and second control means for controlling a second one of the machining parameters to make the detected flow rate equal to a predetermined constant magnitude.

Alternatively the first control means may be operative to control the machining current to have its predetermined constant magnitude and the second control means may be operative to control the machining voltage to make the detected flow rate equal to its predetermined constant magnitude.

With the working electrode arranged to be moved toward the workpiece at a constant feed rate, the first control means may advantageously comprise means for feeding the machining electrode toward the workpiece at such a constant feed rate that the density of the machining current in the working gap becomes constant and the second control means may be operative to control the machining voltage to make the detected flow rate equal to its predetermined constant magnitude.

Alternatively, the first control means may be operative to control the machining voltage to have its predetermined constant magnitude and the second control means may be operative to control the feed rate to make the detected flow rate equal to its predetermined constant magnitude.

BRIEF DESCRIPTION OF THE DRAWINGS

The invention will become more readily apparent from the following detailed description taken in conjunction with the accompanying drawings in which.

As will be well-known, a liquid electrolyte flows through a working gap formed across a workpiece and the opposite working electrode, at a flow rate Q dependent upon both a pressure P under which the electrolyte is supplied to the gap and a width $g$ of the gap. Namely, the flow rate Q can be expressed by the equation $$Q = f(g, P) \qquad (2)$$

From the above Equation 2 it can be seen that a change in gap width $g$ causes the corresponding changes in flow rate and hydraulic pressure Q and P respectively. If the gap width $g$ is maintained at a predetermined constant magnitude then the flow rate and hydraulic pressure Q and P are maintained constant and vice versa.

The invention is based upon the principles that a selected one of machining parameters determining a working gap between a workpiece and the opposite machining electrode, that is to say, a machining voltage applied across the gap, a machining current flowing through the gap (and a current density thereof) and a feed rate at which the workpiece is fed toward the machining electrode is controlled to have always a predetermined constant magnitude while a second one of the machining parameters is controlled to maintain the actual flow rate of a liquid electrolyte involved at a predetermined constant magnitude. To this end, a detector or sensor device is provided for detecting or sensing the flow rate Q of the electrolyte. Also, in order to maintain a constant magnitude of a hydraulic pressure P under which the electrolyte is supplied to the working gap, a pump for suppling the liquid electrolyte to the working gap is designed to have a predetermined constant pressure on the delivery side thereof and a sufficiently high capability.

DESCRIPTION OF THE PREFERRED EMBODIMENTS

Figure 1:
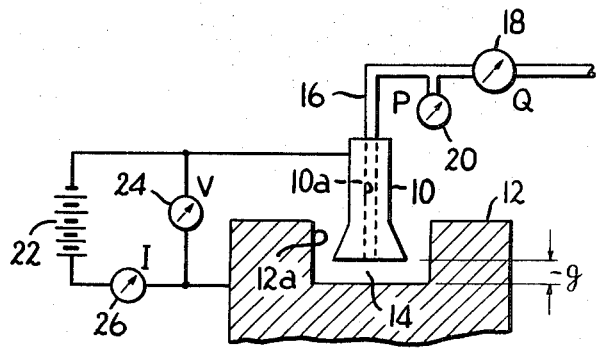
FIG. 1 is a fragmental schematic view, partly in section of an electrolytically machining apparatus and more particularly, a working gap involved and the associated components.

Referring now to the drawings and FIG. 1 in particular it is seen that a workpiece working electrode 10 is disposed oppositely to a workpiece 12 to form a working gap 14 having a width of $g$. A liquid electrolyte (not shown) is supplied from a reservoir (not shown) therefor, through a line 16 and a passageway 10a communicating with the line 16 and extending through the electrode 10 to the working gap 14. The line 16 has disposed therein a flow meter 18 for measuring a flow rate Q at which the electrolyte is supplied to the working gap and connected thereto a manometer 20 for measuring a pressure P under which the electrolyte is supplied to the working gap 14. A source 22 of direct current is connected across the workpiece and working electrode 12 and 10 respectively such that the workpiece is electrically positive with respect to the electrode. In operation, a machining voltage V applied across and a machining current J flowing through the working gap 14 are measured respectively by a voltmeter 24 and an ammeter 26 as shown in FIG. 1.

In operation, the liquid electrolyte as supplied to the working gap 14 is electrolyzed by the action of the electrical energy applied across the gap to electrolytically machine the workpiece 12 to form a recess 12a on the surface thereof opposed to the electrode and having a configuration complementary to that of the electrode. Assuming that the workpiece 12 has a surface area of S to be machined, and and the electrolyte has a specific resistance of $\rho$, it will be readily understood that the machining parameters indicated by the flow meter, manometer, voltmeter and ammeter 18, 20, 24 and 26 respectively hold the relationships as defined in the above Equations 1 and 2.

Figure 2:
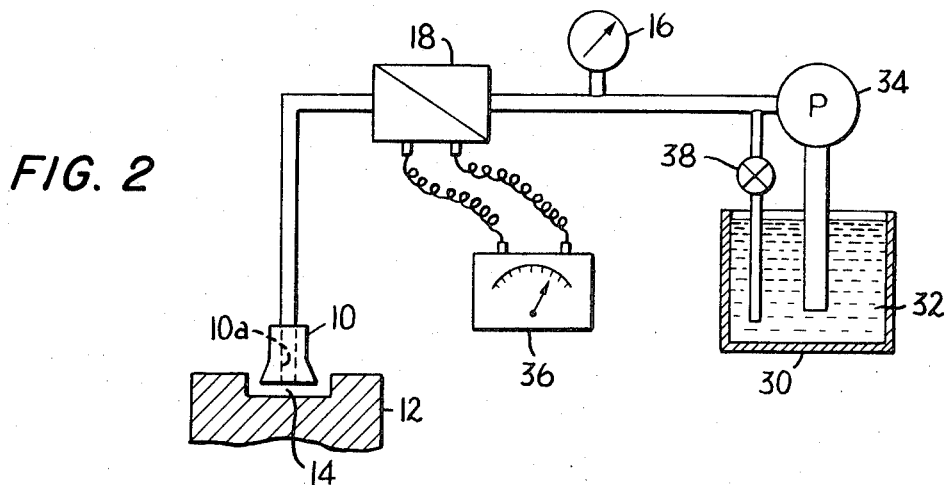
FIG. 2 is a schematic view partly in section of an electrolytically machining apparatus useful in explaining the principles of the invention.

The principles of the invention will now be described with respect to FIG. 2 wherein like reference numerals designate the components corresponding or similar to those illustrated in FIG. 1. As shown in FIG. 2, a reservoir 30 contains a quantity of liquid electrolyte 32 which is, in turn, sucked by a pump 34. The pump 34 delivers a quantity of electrolyte to a working gap 14 through a line 16 and a passageway 10a such as previously described. As in the arrangement of FIG. 1, the flow rate and pressure of the electrolyte are measured by a flow meter and manometer 18 and 20 respectively. The flow meter 18 is preferably of the electromagnetic type and connected to an indicator 36. As shown in FIG. 2, a a line extends from the delivery side of the pump 34 to the reservoir 30 and is provided with a bypass valve 38 for the purpose of returning an excessive quantity of delivered electrolyte to the reservoir 30.

In addition to direct reading of the flow rate Q (which was measured by the electromagnetic flow meter 18) by the indicator 36, the arrangement illustrated is operative to enter the read flow rate into either a system with the source of electrical energy such as shown by the reference numeral 22 (FIG. 1) or a control system for controlling the feed of a workpiece involved to control the associated machining voltage and current, V and I respectively, or a feed rate for the workpiece thereby to maintain the flow rate Q at a predetermined constant magnitude: However either of such systems is not illustrated in FIG. 2 and will be described hereinafter.

Figure 3:
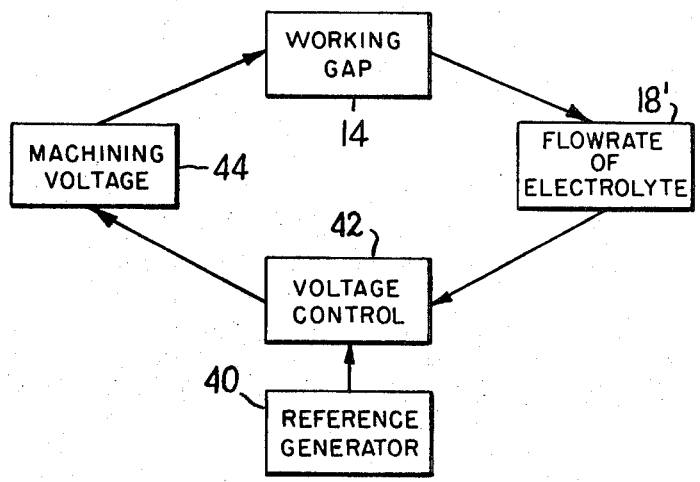
FIG. 3 is a block diagram of an electrolytically machining apparatus operated in accordance with the principles of the invention.

FIG. 3 illustrates in block form the principles of the invention applied to the case in which a change in flow rate Q due to a variation in specific resistance $\rho$ of the liquid electrolyte involved is compensated for by control of the associated machining voltage for the purpose of maintaining the associated working gap of a predetermined constant width.

As shown in FIG. 3, a reference generator 40 for producing a reference for flow rate is operatively connected to a voltage control 42 for controlling the abovementioned machining voltage. A flow meter 18, such as the electromagnetic flow meter 18 shown in FIG. 2, measures the flow rate Q of the liquid electrolyte flowing through a working gap represented by a block 14. As above described, the measured flow rate Q can vary in accordance with the specific resistance $\rho$ of the particular portion of the liquid electrolyte flowing through the gap 14. The flow rate Q measured by the flow meter 18 is supplied to the voltage control 42 where it cooperates with the reference magnitude $Q_0$ for flow rate supplied to the control to cause the latter to produce a machining voltage represented by a block 44. This voltage is applied across the working gap 14 and serves to maintain the flow rate Q at the predetermined constant magnitude thereby to hold always the working gap constant.

Figure 4:
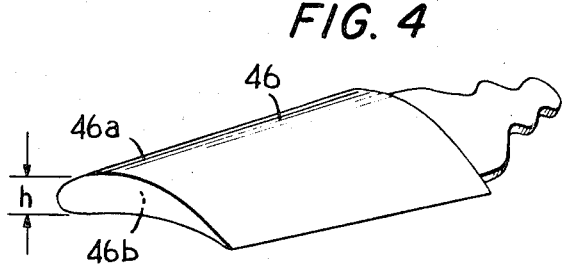
FIG. 4 is a perspective view of a turbine blade electrolytically machined by an apparatus constructed in accordance with the principles of the invention.

Referring now to FIG. 4, there is illustrated a turbine blade after having been electrolytically machined by the apparatus of the invention as above described in conjunction with FIGS. 2 and 3. Upon electrolytically machining the turbine blade designated by the reference numeral 46, its outer and inner surfaces 46a and b were disposed oppositely to a pair of working electrodes with suitable gaps interposed therebetween. Any deviation from a predetermined magnitude of the associated machining gap generally appears as a change in the maximum thickness h of the resulting blade (see FIG. 4). It has been found that with the apparatus as shown in FIGS. 2 and 3 used to electrolytically machine a multiplicity of turbine blades into a maximum thickness h of 10 mm. a change in the maximum thickness h was within ±0.02 mm. ensuring a high degree of machining accuracy.

Figure 5:
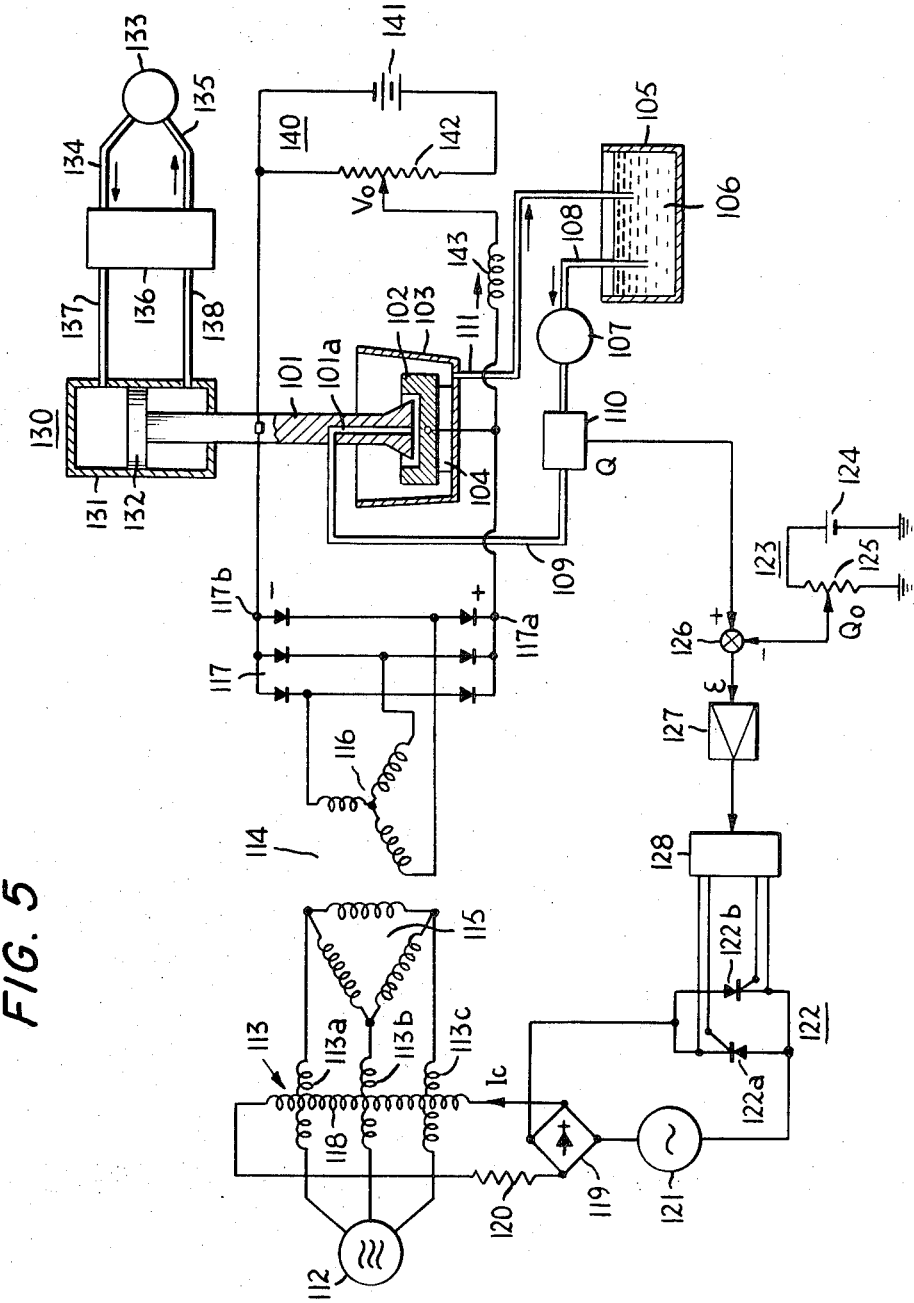
FIG. 5 is an electric circuit diagram of an electrolytically machining apparatus constructed in accordance with the principles of the invention with certain parts illustrated in section.

Referring now to FIG. 5 there is an electrolytically machining apparatus constructed in accordance with the principles of the invention. An arrangement illustrated comprises a working electrode 101 and a workpiece 102 disposed in opposite relationship within a machining vessel 103 to form a machining gap therebetween with the workpiece rigidly secured to a supporting block 104 fixed to the bottom of the vessel. A reservoir 105 contains a quantity of liquid electrolyte 106 such as an aqueous solution of sodium chloride adapted to be sucked by a pump 107 through a conduit 108 to be forcibly supplied to the machining gap through another conduit 109 and a passageway 101a disposed in the electrode 101. The conduit 109 has operatively connected thereto a flow rate detector or an electromagnetic flow meter 110 for detecting or measuring the flow rate Q of the electrolyte flowing through the same. The interior of the vessel 103 communicates with the reservoir 105 through a return conduit 111 for the purpose of returning the liquid electrolyte accumulated in the vessel back to the reservoir 105.

In order to supply electrical energy across the machining gap between the workpiece and electrode 102 and 101 respectively, there may be provided a three phase supply system. The three phase supply is shown in FIG. 5 as comprising a source 112 of three phase alternating current power electrically connected through a saturable reactor 113 to a power transformer generally designated by the reference numeral 114. The transformer 114 includes three primary delta-connected windings 115 with junctions of the windings connected to three phases of the source 112 through three reactor windings 113a, b and c respectively. The transformer 114 includes a secondary star-connected winding assembly 116 electrically connected to a three phase full-wave rectifier assembly 117. The rectifier assembly 117 has a positive output terminal 117a electrically connected to the workpiece 102 and a negative output terminal 117b electrically connected to the working electrode 101.

The saturable reactor 113 further includes a control winding 118 inductively coupled to all the reactor windings 113a, b and c for three phases and electrically connected across a pair of DC output terminals of a single phase full-wave rectifier bridge 119 through a current limiting resistor 120. In order to energize the rectifier bridge 119, a source 121 of single phase alternating current is electrically connected at one end to one of two AC input terminals and at the other end to the other AC input terminal to a control circuit 122 including a pair of antiparallel thyristors 122a and b for the purpose as will be apparent hereinafter.

In order to compare the flow rate Q measured by the electromagnetic flow meter 110 with a predetermined constant reference flow rate $Q_0$, a reference signal generator circuit generally designated by the reference numeral 123 includes a source of DC reference voltage denoted by a battery 124 and a potentiometer 125 connected across the source 124. A signal for the reference flow rate $Q_0$ is developed at a slide on the potentiometer 125 and applied to a comparison point 126. Also applied to the comparison point 126 is a signal representing a flow rate Q measured by the flow meter 110. Both the signals are opposite in polarity to each other and in this case the measured signal Q has the positive polarity while the reference signal $Q_0$ has the negative polarity with respect to the ground. The measured signal is algebraically summed to the reference signal to produce an error signal $\epsilon$ which can be positive or negative as the case may be. This error signal $\epsilon$ is amplified by an amplifier 127 connected to a firing circuit 128. The circuit 128 is operative to respond to the amplified error signal to supply a gating signal to each of the thyristors 122a and b dependent upon the polarity and magnitude of the error signal thereby to control a firing angle of each thyristor.

In order to move the working electrode 101 toward and away from the workpiece 102, a hydraulic servo-feed system generally designated by the reference numeral 130 includes a hydraulic cylinder 131 and a piston 132 slidably disposed in the cylinder and operatively connected to the electrode 101. The servo-feed system 130 further includes a hydraulic source 133 connected through a feed and a return line 134 and 135 respectively to a servo or change-over valve 136 which is, in turn, connected through lines 137 and 138 to both compartments formed between both ends of the cylinder 131 and the piston 132 respectively.

To provide a reference magnitude of a machining voltage, a reference voltage generator circuit generally designated by the reference numeral 140 includes a source 141 of direct current and a potentiometer 142 connected across the source and having its slide connected to the junction of the workpiece 102 and the positive terminal 117a of the rectifier assembly 117 through a servo or valve operating winding 143 with the negative terminals of the rectifier assembly and source connected together. The winding 143 serves to control the change-over valve 136.

Figure 6:
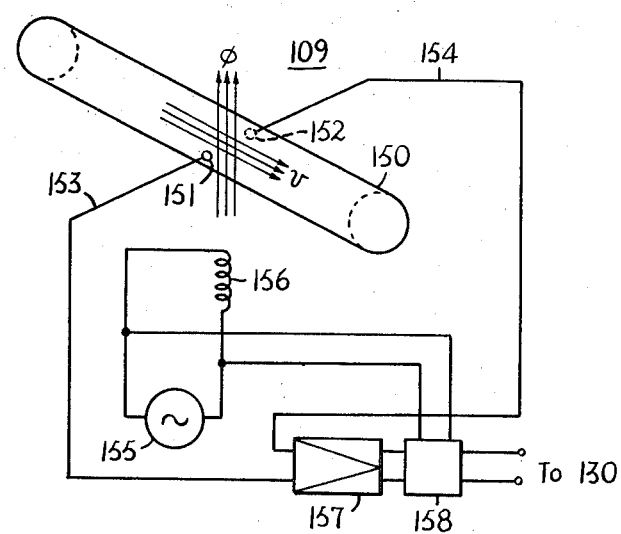
FIG. 6 is a diagrammatic view of a flow meter which may be used in the invention.

The electromagnetic flow meter 109 may be preferably of a construction as illustrated in FIG. 6. The flow meter 109 comprises a section of tube 150 through which a liquid electrolyte involved flows at a speed $v$ in the direction of the arrow shown in FIG. 6. A pair of opposite electrodes 151 and 152 are disposed on a diameter of the cross section of the tube 150 within the latter such that they are in contact with the elecrolyte flowing through the tube but electrically insulated from each other and from the tube. A pair of lead-in conductors 153 and 154 are connected to the electrodes 151 and 152 so that those portions thereof adjacent the electrodes extend orthogonally to the direction of the flow of electrolyte. A source 155 of alternating current is connected to energize an exciting winding 156 whereupon a magnetic flux $\phi$ is produced orthogonally to both the direction of the flow of electrolyte and a line passing through the centers of the electrodes 151 and 152 and aligned with the adjacent portions of the conductors 153 and 154 to cross the flow of electrolyte. Thus it will be appreciated that a voltage proportional to the speed $v$ of the electrolyte is developed between the electrodes 151 and 152 through electromagnetic induction as well-known in the art. This voltage is amplified by an amplifier 157 and then applied to a phase discriminator 158 also supplied by the source 155. The discriminator 158 is operative to phase-discriminate the output from the amplifier 157 to convert it to a direct current whose magnitude provides a measure of the speed $v$ and therefore flow rate Q of the electrolyte.

In operation, the actual flow rate Q of the particular liquid electrolyte measured by the electromagnetic flow meter 109 in the manner as above described is compared with the reference rate $Q_0$ provided by the potentiometer 125 at the comparison point 126. That is, the point 126 provides a difference or error signal representative of the difference between both flow rates. If the measured rate Q is greater than the reference rate $Q_0$, the firing circuit 128 lags the firing angle of each thyristor 122a or b thereby to increase a direct current $I_c$ flowing through the control reactor winding 118. This increase in current causes the impedances of the reactor windings 113a, b and c to decrease resulting in an increase in machining current flowing through the working gap between the workpiece and machining electrode 102 and 101 respectively. On the contrary, a measured rate Q smaller than the reference rate $Q_0$ will cause the firing device 128 to lead the firing angle of each thyristor 122 to decrease the current $I_c$ leading to a decrease in machining current.

On the other hand, the valve operating winding 143 is excited in one or the other direction with a direct current proportional to a difference between a machining voltage V applied across the working gap and the reference voltage $V_0$ developed at the slide on the potentiometer 142. Under these circumstances, if the actual machining voltage V is greater than the reference voltage $V_0$, a current flows through the winding 143 in the direction of the arrow denoted adjacent the latter to actuate the change-over valve 136 so as to communicate the line 134 with the line 137 and communicate the line 138 with the line 135. This permits the upper cylinder compartment to undergo a hydraulic pressure proportional to the direct current flowing through the winding 143 thereby to move the working electrode 101 toward the work piece 102 until the actual machining voltage V is equal to the reference voltage $V_0$.

If the machining voltage V is smaller than the reference voltage $V_0$, a direct current flows through the winding 143 in the direction reversed from that illustrated whereby the change-over valve 136 is operated to communicate the lines 134 and 135 with the lines 138 and 137 respectively. This permits the lower cylinder compartment to undergo a hydraulic pressure proportional to the direct current flowing through the winding 143. Therefore the electrode 101 is moved away from the workpiece 102 until the actual machining voltage V is equal to the reference voltage $V_0$. In this way the actual machining voltage V is maintained equal to the predetermined constant reference voltage $V_0$. It is assumed that a certain magnitude of machining current is flowing through the working gap between the workpiece and machining electrodes 102 and 101 respectively and the electrolyte has decreased in specific resistance. In order to maintain the particular machining voltage V at its predetermined constant magnitude or at the reference magnitude $V_0$, the servo-feed system 130 is operated to increase the working gap in the manner as previously described. That is, the working gap increases to hold the following equation $$V = \rho J g \qquad (3)$$

which is readily derived from the Equation 1. This increase in dimension of working gap causes an increase in flow rate Q of the electrolyte beyond the reference flow rate $Q_0$. Thus the machining current I and therefore the current density J increases. As a result, the working gap g decreases until the original state yields as will be readily understood from the Equation 3. That is, the actual flow rate Q equals the constant reference flow rate $Q_0$ and the gap is maintained substantially constant.

On the contrary, if the specific resistance $\rho$ of the electrolyte has increased, then the servo-feed system 130 is operated to decrease the working gap for the purpose of maintaining the machining voltage V equal to the reference voltage $V_0$. This decrease in the working gap g causes the actual flow rate of the electrolyte to decrease. Therefore the machining current decreases to increase the working gap until the actual flow rate Q is equal to the reference flow rate $Q_0$. Accordingly the working gap g is maintained substantially at a predetermined constant magnitude.

Under these circumstances, if the pump 107 having a high capability is used to cause a pressure on the output side thereof to remain substantially unchanged, then the working gap is maintained at its predetermined constant magnitude.

While either or both of the reference quantities $Q_0$ and $V_0$ can be varied by adjusting the slide or slides on the associated potentiometer or potentiometers as the case may be, it is now assumed that the reference quantity $Q_0$ remains unchanged. Under the assumed condition, the apparatus as illustrated in FIG. 5 can electrolytically machine a multiplicity of workpieces into the same configuration as desired with a constant, high degree of machining accuracy irrespective of changes in concentration and temperature of a liquid electrolyte involved.

Figure 7:
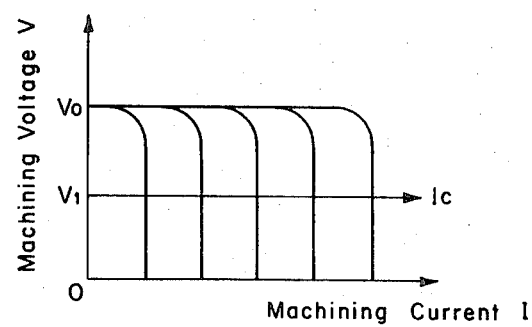
FIG. 7 is a graph useful in explaining the operation of the apparatus shown in FIG. 5.

If the electric supply system 112–114–117 has its drooping characteristic such as denoted by a family of curves as shown in FIG. 7 wherein a machining voltage V on the axis of ordinates is plotted against a machining current I on the axis of abscissas then the machining voltage V remains unchanged. In FIG. 7 this voltage is designated by $V_1$ and a voltage in no load state is designated by $V_0$. Under these circumstances, as the direct current $I_c$ flowing through the control reactor winding 118 increases, the operating point of the supply system is moved in parallel to the axis of abscissas or current.

Figure 8:
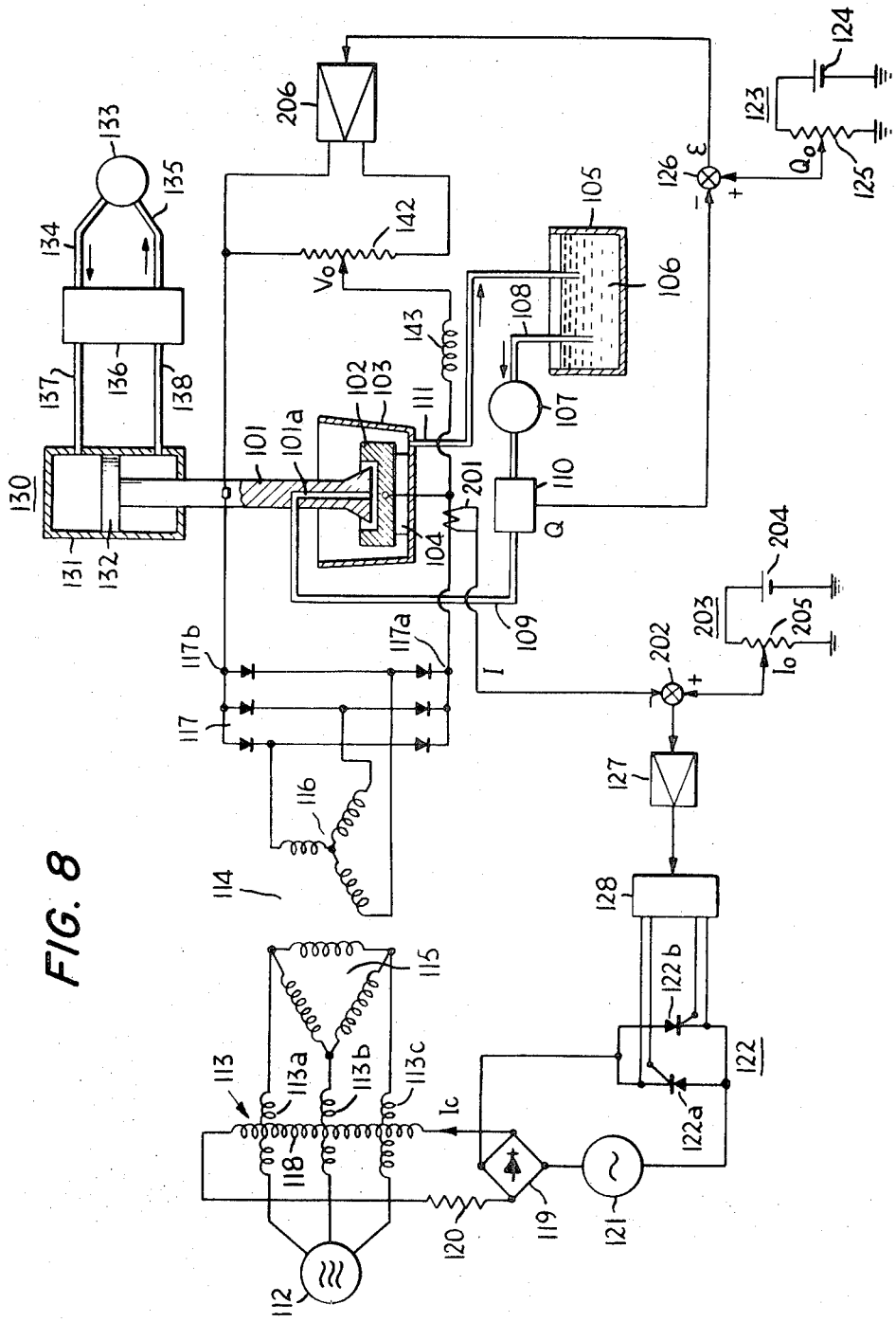
FIG. 8 is an electrical circuit diagram of another electrolytically machining apparatus constructed in accordance with the principles of the invention with certain parts illustrated in section.

Referring now to FIG. 8 wherein like reference numerals designate the components corresponding to those shown in FIG. 5, there is illustrated one form of the invention operative in the manner as illustrated in FIG. 3. An arrangement illustrated includes control means for maintaining a machining current at a predetermined constant magnitude and also responding to a change in flow rate Q of a liquid electrolyte involved to control a reference voltage $V_0$. Then the control means is operatively coupled to a servo-feed system involved thereby to maintain the associated working gap at a predetermined constant magnitude.

In FIG. 8 it is seen that a current transformer 201 is inductively coupled to a conductor connecting a rectifier assembly 112 and a workpiece 102 to sense a machining current I flowing the conductor. The sensed current with a predetermined polarity, in this case, the negative polarity is applied to another comparison point 202. A reference current generator circuit generally designated by the reference numeral 203 includes a source 204 of direct current having a negative terminal grounded and a potentiometer 205 connected across the source with its slide connected to the comparison point 202. A predetermined constant reference signal $I_0$ for machining current provided by the potentiometer 205 is applied to the comparison point 202 with its polarity positive with respect to the ground. Developed at the comparison point 202 is a difference or error signal representative of the difference between the measured and reference currents which can be positive or negative as the case may be. This voltage difference signal is amplified by an amplifier 127 and serves to maintain the particular machining current at a predetermined constant magnitude or the reference magnitude $I_0$ in the similar manner as previously described in terms of control of the machining voltage and in conjunction with FIG. 5.

Since the arrangement illustrated in FIG. 8 is contemplated to vary a reference voltage $V_0$ in accordance with a flow rate Q of a liquid electrolyte involved while the machining current remains unchanged, a potentiometer 142 for the machining reference voltage has applied thereacross a difference between the measured and reference flow rates Q and $Q_1$ of the electrolyte produced in the quite same manner as previously described in conjunction with FIG. 5. Specifically, the difference between the measured and reference flow rates is amplified by an amplifier 206 and then applied across the potentiometer 142. If the measured flow rate Q is larger than the reference flow rate $Q_0$, the output from the amplifier 206 decreases whereas if the measured magnitude Q is smaller than the reference magnitude $Q_0$, the output will increase proportionally to the difference therebetween. Therefore the reference voltage $V_0$ decreases when the measured or actual flow rate Q is greater than the reference rate $Q_0$ and increases when the actual rate is smaller than the reference rate. In other respects the arrangement is substantially the same as that illustrated in FIG. 5.

Assuming that a specific resistance $\rho$ of an electrolyte has decreased with the particular machining voltage V while the corresponding machining current and therefore its density remains unchanged, a direct current flowing through a valve operating winding 143 is operated to increase the working gap according to the Equation 1. This increase in dimension of the machining gap causes an increase in flow rate of the electrolyte flowing through the gap beyond the reference flow rate $Q_0$ leading to a decrease in reference voltage $V_0$. Then the winding 143 has flowing therethrough a direct current tending to decrease the working gap in order to hold the Equation 1 with the now decreased voltage $V_0$. As a result the actual flow rate Q is equal to the reference rate $Q_0$. Thus the gap returns back to its original magnitude.

On the contrary, an increase in specific resistance of the electrolyte causes the process reversed from above described until the actual flow rate is equal to reference rate $Q_0$. Also the gap returns back to its original magnitude.

Thus it will be appreciated that in the arrangement illustrated in FIG. 8, control means for controlling the actual flow rate Q of the electrolyte to a predetermined magnitude or the reference rate $Q_0$ is also operated to suppress any change in the working gap due to a variation in specific resistance $\rho$ of the electrolyte. As in the arrangement as illustrated in FIG. 5, the working gap can be maintained at its predetermined constant magnitude as long as the associated pump 107 continuously provides on its output side a hydraulic pressure remaining unchanged.

Figure 9:
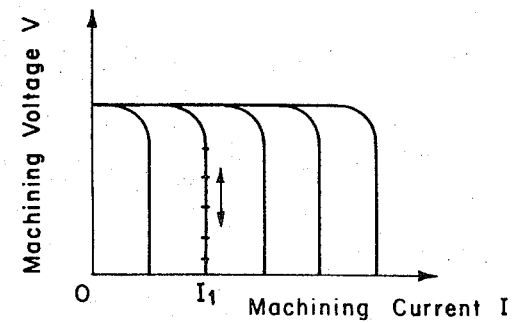
FIG. 9 is a graph useful in explaining the operation of the apparatus shown in FIG. 8.

If it is assumed that the arrangement of FIG. 8 has its drooping characteristic represented by a family of curves as shown in FIG. 9 similar to FIG. 7, then the machining current I is maintained at a constant magnitude that may be equal to a magnitude $I_1$ and the supply system has it operating point movable in parallel to the axis of ordinates or voltage as the actual flow rate Q of the electrolyte varies.

Figure 10:
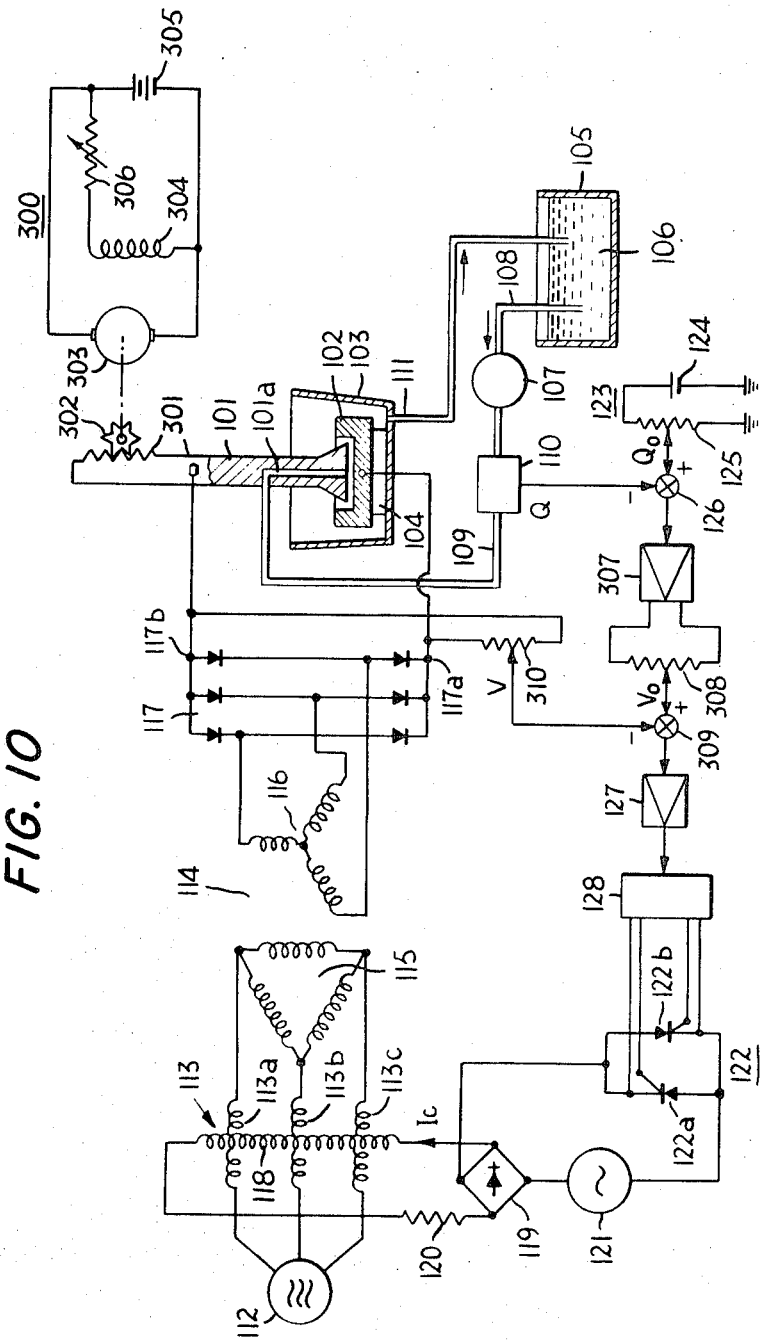
FIG. 10 is a view illustrating still another apparatus of the invention.

Referring now to FIG. 10, there is illustrated another form of the invention applied to a mechanism for feeding a working electrode toward the associated workpiece at a constant speed, in the electrolytically machining process it is well-known that if a source of electrical energy is not of the constant current characteristic that a current density of a current flowing through the associated working gap is a function of a feed rate of a workpiece involved. Under these circumstances, if the feed rate remains unchanged the current density is maintained constant irrespective of the magnitudes of specific resistance of a liquid electrolyte involved and the corresponding machining voltage. Therefore it is apparent from the Equation 1 that with the specific resistance $\rho$ of the electrolyte maintained constant, it is required only to adjust the particular machining voltage V to a predetermined constant magnitude in order to cause the working gap to remain unchanged. However since the specific resistance of the electrolyte can vary during the electrolytically machining operation as previously described, it is necessary to compensate for such a variation in specific resistance. The arrangement illustrated in FIG. 10 contemplates to compensate for a variation in specific resistance of the electrolyte by changing the associated machining voltage so as to maintain the flow rate of the electrolyte constant.

In FIG. 10 wherein like reference numerals designate the components corresponding or similar to those illustrated in FIG. 5, a mechanism for feeding a working electrode toward the opposite workpiece at a constant feed rate generally designated by the reference numeral 300 comprises a rack 301 disposed on a feed shaft for a working electrode 101, a pinion 302 meshing the rack and a shunt DC motor 303 for driving the pinion 302. The motor 303 includes a shunt field winding 304 connected across a source 305 of direct current through a variable field resistor 306.

In operation the motor 303 is excited to a predetermined fixed magnitude by the source 305 through the filed resistor 306 to rotate at a predetermined constant speed thereby to move the working electrode 101 toward the workpiece 102 at a constant feed rate.

On the other hand, a comparison point 126 has a difference between a measured and a reference flow rate Q and $Q_0$ respectively of a liquid electrolyte developed thereat in the same manner as previously described in conjunction with FIG. 5. This voltage differential is applied to an amplifier 307 having an output connected across a potentiometer 308 whose slide is connected to another comparison point 309. The amplifier 307 is adapted to provide an output voltage in variable accordance with the polarity and magnitude of the difference between the measured and reference flow rates. More specifically, the output voltage from the amplifier 307 decreases proportionally the flow rate differential when the measured flow rate Q is greater than the reference flow rate $Q_0$ and increases when the measured rate is smaller than the reference rate.

As shown in FIG. 10, a potentiometer 310 connected across the workpiece and working electrode 102 and 101 supplies a voltage proportional to the particular machining voltage V to the comparison point 309 where a difference between the said voltage and the reference voltage $V_0$ proportional to the difference between the measured and reference flow rates of the electrolyte is developed. Then the voltage differential from the comparison point 309 is applied to an amplifier 127 and operated to maintain the machining voltage at a predetermined constant magnitude in the same manner as already described in conjunction with FIG. 5. In other respects the arrangement is substantially identical to that shown in FIG. 5.

With the machining voltage and current density V and J respectively remaining unchanged, a decrease in specific resistance $\rho$ of the electrolyte tends to increase the working gap $g$ in accordance with the Equation (1). This causes an increase in flow rate Q of the electrolyte beyond the reference rate $Q_0$ leading to a decrease in voltage applied across the potentiometer 308 or the reference voltage $V_0$ which is accompanied by a decrease in machining voltage V. Therefore the working gap becomes smaller in accordance with the Equation 1 until the actual flow rate Q equals the reference rate $Q_0$ to return the gap back to its original magnitude.

An increase in specific resistance of $\rho$ of the electrolyte causes the process reversed from that above described until the working gap returns back to its original magnitude while the actual flow rate is maintained equal to the reference flow rate.

From the foregoing it will be appreciated that the invention aplied to an electrolytically machining apparatus of constant voltage control and constant speed feed type can electrically machine a multiplicity of workpieces into the same configuration as desired with a high constant degree of accuracy irrespective of the temperature and concentration of the liquid electrolyte involved.

Figure 11:
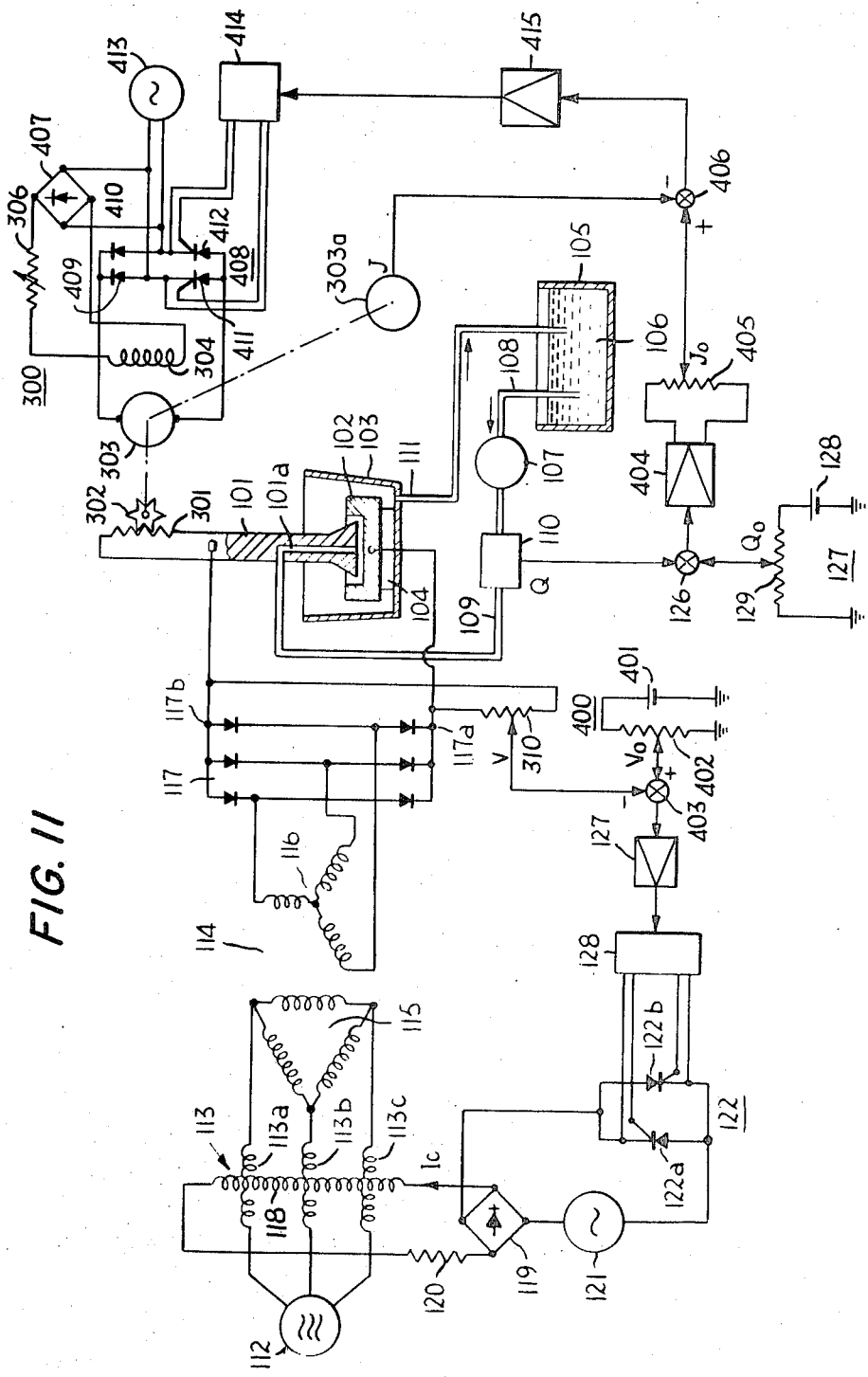
FIG. 11 is a view illustrating a further apparatus of the invention.

Referring now to FIG. 11, there is illustrated another modification of the invention wherein with a machining voltage remaining unchanged, the current density of the associated machining current is controlled through a change in flow rate of the electrolyte due to a variation in specific resistance thereof for the purpose of maintaining the working gap constant. In other words, as the current density J is proportional to a feed rate at which the working electrode is fed toward the opposite workpiece, that feed rate is controlled so as to equal the actual flow rate Q to the reference rate $Q_0$ thereby to control the current density J.

In FIG. 11 wherein like reference numerals designate the component corresponding or similar to those shown in FIGS. 5 and 8, a reference voltage generator device generally designated by the reference numeral 400 includes a source 401 of direct current having its negative terminal grounded and a potentiometer 402 connected across the source 401 and having a slide connected to a comparison point 403. The comparison point 403 is connected to a slide on a potentiometer 310 connected across a workpiece 102 and the opposite working electrode 101 as in FIG. 10. Thus the comparison point 403 provides a difference between the reference and measured voltages $V_0$ and $V$ respectively which can be positive or negative as the case may be. This voltage differential is applied to an amplifier 127 and operated to render the actual machining voltage $V$ equal to the reference voltage $V_0$ in the same manner as in the arrangement illustrated in FIG. 10 excepting that the reference voltage $V_0$ in this case remains unchanged.

On the other hand, another comparison point 126 provides a difference between the actual flow rate $Q$ of the electrolyte and a reference rate $Q_0$ in the same manner as already described in conjunction with FIG. 5. This voltage difference between both flow rates $Q_0$ and $Q$ is applied to an amplifier 404 having an output connected across a current density potentiometer 405. The output from the amplifier 404 increases proportionally to the difference between the actual and reference flow rates when the actual rate is greater than the reference rate and decreases proportionally to the difference therebetween when the actual rate is smaller than the reference rate. A voltage developed at the slide on the potentiometer 405 provides a reference $J_0$ for current density which is applied to an additional comparison point 406. It is to be noted that the reference $J_0$ depends upon the difference between the actual and reference flow rates.

A direct current motor 303 includes a field winding 304 excited by a full wave rectifier bridge 407 rather than by a battery such as the source 305 shown in FIG. 10 and an armature winding energized by another full wave rectifier bridge generally designated by the reference numeral 408. The rectifier bridge 408 includes a pair of semiconductor diodes 409 and 410 and a pair of thyristors 411 and 412 arranged in the form of a bridge. Both bridges 407 and 408 are energized by a source 413 of single phase alternating current. Each of the thyristors 411 and 412 includes a gate electrode connected to a firing circuit 414. Also the driving motor 303 is mechanically coupled to a generator 303a rotatable at the same speed as the motor to provide an actual current density $J$ which is, in turn, applied to the comparison point 406 with its polarity opposite to that of the reference $J_0$. Thus a difference between the actual and reference current densities is developed at the comparison point 406 with the polarity positive or negative as the case may be. This difference is applied to the firing circuit 414 through an amplifier 415. In other respects the arrangement is substantially identical to that illustrated in FIG. 10.

The firing circuit 414 serves to lead a firing angle at which each thyristor 411 or 412 is fired thereby to decrease the armature current of the motor 303 when the actual density $J$ is greater than the reference density $J_0$ and to lag the firing angle to increase the armature current when the actual density is smaller than the reference density. In either event the actual current density is controlled to equal the reference density.

With the particular machining voltage $V$ remaining unchanged, it is assumed that the specific resistance $\rho$ of the electrolyte has varied thereby to increase the working gap. Under the assumed condition, the actual flow rate $Q$ increases beyond the reference rate $Q$ to increase the magnitude of the reference signal $J_0$ for current density leading to an increase in feed rate at which the electrode 101 is fed toward the workpiece 102. This permits the actual current density to increase until the actual flow rate is equal to the reference rate while the working gap returns back to its original magnitude.

On the contrary, a variation in specific resistance of the electrolyte to decrease the working gap causes a decrease in the actual flow rate and therefore the actual current density until the gap similarly returns back to its original magnitude.

From the foregoing it will be appreciated that the arrangement illustrated in FIG. 11 operative to control the feed rate of the working electrode in accordance with the difference between the actual and reference current densities to maintain the working gap at a predetermined constant magnitude irrespective of the temperature and concentration of the electrolyte.

While the invention has been illustrated and described in conjunction with several preferred embodiments thereof it is to be understood that numerous changes and modification may be resorted to without departing from the spirit and scope of the invention.

What we claim is:

1. An apparatus for electrolytically machining a workpiece comprising, in combination,
    (a) a movably mounted working electrode movable towards and away from a workpiece to be machined defining a working gap therebetween,
    (b) means for supplying a liquid electrolyte to said working gap,
    (c) electrical circuit means for applying a machining voltage across and a flow of machining current through said workpiece and said working electrode to electrolyze the liquid electrolyte supplied to said working gap,
    (d) detector means for detecting the flow rate of the liquid electrolyte supplied to said working gap and developing a corresponding signal,
    (e) first control means for controlling said machining voltage to maintain same at a predetermined constant magnitude, and
    (f) second control means receptive of said signal for controlling said machining current to cause the flow rate of the liquid electrolyte through said working gap to be equal to a predetermined magnitude.

2. An electrolytically machining apparatus as claimed in claim 1 wherein said first control means includes means operative to control said machining current to have its predetermined constant magnitude, and wherein said second control means includes means operative to control the machining voltage to make the detected flow rate equal to its predetermined constant magnitude.

3. An electrolytically machining apparatus as claimed in claim 1 wherein said first control means comprises means for feeding said machining electrode toward said workpiece at such a constant rate that the current density in said working gap becomes constant, and wherein said second control means includes means operative to control said machining voltage to make the detected flow rate equal to its predetermined constant magnitude.

4. An electrolytically machining apparatus as claimed in claim 1 wherein said first control means includes means operative to control said machining voltage to its predetermined constant magnitude, and wherein said second control means includes means operative to control the feed rate at which said working electrode is moved toward said workpiece so as to make the detected flow rate equal to its predetermined constant magnitude.

5. An apparatus for electrolytically machining a workpiece comprising: a movably mounted electrode movable towards and away from a workpiece to be electrolytically machined and defining therebetween a machining gap; electrically-controlled actuating means for selectively moving said electrode towards and away from the workpiece in response to an electric control signal to thereby selectively vary the dimension of said machining gap; flow means operative during use of the apparatus to flow a liquid electrolyte through said machining gap; flow sensing means for sensing the actual flow rate of liquid electrolyte through said machining gap and providing a corresponding flow rate signal; and electric circuit means including said electrode and workpiece responsive to said flow rate signal for applying a voltage across said machining gap sufficient to electrolyze said liquid electrolyte to effect electrolytic machining of the workpiece and developing an electric control signal applied to said electrically-controlled actuating means effective to maintain the dimension of said machining gap at a substantially constant value throughout the electrolytic maching operation.

6. An apparatus according to claim 5; wherein said electric circuit means comprises reference voltage means for providing a reference voltage level indicative of the desired electrolytic machining voltage, voltage applying means for applying a machining voltage across said machining gap having a voltage level proportional to said flow rate signal, and means for comparing the actual voltage level applied across said machining gap with said reference voltage level and deriving therefrom said electric control signal.

7. An apparatus according to claim 5; wherein said electric circuit means comprises reference current means for providing a reference current signal indicative of the desired electrolytic machining current, current sensing means for sensing the actual machining current flowing during the electrolytic machining operation and providing a corresponding actual current signal, means for comparing said actual current signal with said reference current signal and deriving therefrom a voltage control signal for controlling the voltage applied across said machining gap.

References Cited
UNITED STATES PATENTS

| | | | |
|---|---|---|---|
| 3,287,245 | 11/1966 | Williams | 204—224 |
| 3,365,381 | 1/1968 | Fromson | 204—229 X |
| 3,440,156 | 4/1969 | Dickson | 204—224 X |
| 3,453,192 | 7/1969 | Wilkinson | 204—228 X |
| 3,480,530 | 11/1969 | Voorhies | 204—229 X |

JOHN H. MACK, Primary Examiner

D. R. VALENTINE, Assistant Examiner

U.S. Cl. X.R.

204—143 M, 225, 228, 229